(12) United States Patent
Michelau et al.

(10) Patent No.: US 6,966,572 B2
(45) Date of Patent: Nov. 22, 2005

(54) FOLDING RIDING VEHICLE

(75) Inventors: Frederick Michelau, Des Plaines, IL (US); Thomas Schlegel, Wheaton, IL (US)

(73) Assignee: Radio Flyer Inc., Chicago, IL (US)

( * ) Notice: Subject to any disclaimer, the term of this patent is extended or adjusted under 35 U.S.C. 154(b) by 0 days.

(21) Appl. No.: 10/721,600

(22) Filed: Nov. 25, 2003

(65) Prior Publication Data

US 2005/0110239 A1    May 26, 2005

(51) Int. Cl.⁷ .............................................. B62K 1/00
(52) U.S. Cl. ...................... 280/287; 280/282
(58) Field of Search .................. 280/278, 287, 280/282

(56) References Cited

U.S. PATENT DOCUMENTS

| | | |
|---|---|---|
| 2,619,364 A | 11/1952 | Carson |
| 3,905,618 A | 9/1975 | Miranda |
| 4,111,447 A * | 9/1978 | Ishida .......................... 280/278 |
| 4,457,529 A | 7/1984 | Shamie et al. |
| 6,152,473 A | 11/2000 | Shih |
| 6,530,589 B1 | 3/2003 | Ma |
| 6,575,486 B2 | 6/2003 | Ma |
| 2003/0098567 A1 | 5/2003 | Chuang |
| 2004/0061304 A1 * | 4/2004 | Lim ........................... 280/278 |

* cited by examiner

Primary Examiner—Avraham Lerner
(74) Attorney, Agent, or Firm—DLA Piper Rudnick Gray Cary US LLP (57) ABSTRACT

A folding riding vehicle, such as a tricycle, feature a front frame element to which a front wheel and handlebars are mounted. A front bracket is attached to the front frame element and a seat bracket, to which a seat is mounted, is pivotally attached to the front bracket. A rear frame element has a pair of rear wheels mounted thereto and is attached to a rear bracket. The rear bracket is also pivotally mounted to the front bracket. The rear seat bracket features a pin that engages slots in the seat bracket. As a result, the seat bracket pivots with respect to the front bracket as the rear frame element is pivoted relative to the front bracket as the riding vehicle is moved between folded and unfolded configurations.

28 Claims, 13 Drawing Sheets

FOLDING RIDING VEHICLE

BACKGROUND OF THE INVENTION

The present invention relates generally to riding vehicles and, more particularly, to a riding vehicle that may be folded for ease of transport and storage.

Tricycles have long been a popular type of riding vehicle for children. A tricycle features a front wheel that is equipped with pedals and a pair of rear wheels that are spaced apart and joined to the front wheel by a frame. A seat is typically mounted to the frame. The frame of a conventional tricycle is rigid and includes a head tube that receives a post. The front wheel is attached to the bottom of the post via a fork. Handlebars are attached to the top end of the post and the post pivots about its longitudinal axis within the head tube. As a result, the tricycle may be steered by the handlebars.

A conventional tricycle features a rigid frame. As a result, conventional tricycles are often cumbersome to carry, transport and store. In response to this issue, a variety of folding tricycle arrangements have been developed.

One type of popular folding tricycle is illustrated in U.S. Pat. No. 6,152,473 to Shih and U.S. Pat. No. 6,575,486 to Ma. Each of these two patents discloses a tricycle that features a four element frame, where the four frame elements are pivotally joined. More specifically, a front element is mounted to the pivoting front wheel and handlebars, a middle element has a seat mounted thereto and the rear wheels are mounted to a rear element. The front and rear frame elements are both pivotally mounted to the middle element while a linking element joins the front and rear elements. The linking element is pivotally connected to the front element by its leading end and to the rear element by its trailing end.

As each of the tricycles of the Shih '473 and Ma '486 patents is folded, the front and rear elements pivot clockwise with respect to the middle element. As a result, the seat travels towards the handlebars and the rear wheels travel toward the front wheel. This provides each tricycle with a compact folded configuration that is easy to carry and store.

A disadvantage of the design of the Shih '473 and Ma '486 patents, however, is that each of the four frame elements are pivotally connected to two other frame elements. This results in numerous pivot points which decreases the strength and durability of the tricycle. In addition, a greater number of pivot points and frame links increases manufacturing costs. The design could also provide a pinch hazard in that the four frame elements define a space that could receive a child's hand or arm. This space diminishes as the tricycle is folded so that the child's hand or arm could be trapped therein and possibly pinched.

Alternative folding tricycle designs are presented in U.S. Pat. No. 2,619,364 to Carson and U.S. Pat. No. 4,457,529 to Shamie et al. Each of these patents illustrates a folding tricycle where the rear wheels pivot toward the front wheel as the tricycle is folded. The remaining portion of the tricycle frame is rigid. While such a design is effective and durable, the folded configuration is only slightly more compact than the unfolded/riding configuration.

Accordingly, it is an object of the present invention to provide a folding riding vehicle that is easy and safe to fold.

It is another object of the present invention to provide a folding riding vehicle that folds into a compact configuration that is easy to carry and store.

It is another object of the present invention to provide a folding riding vehicle that is durable and safe to ride.

It is still another object of the present invention to provide a folding riding vehicle that is economical to manufacture.

SUMMARY OF THE INVENTION

The present invention is directed to a folding riding vehicle, such as a tricycle, including a front frame element having a front wheel and handlebars mounted thereto. A front bracket is attached to the front frame element and a seat bracket, having a seat mounted thereon, is pivotally mounted to the front bracket. A rear frame element has a pair of rear wheels mounted thereto and is attached to a rear bracket. The rear bracket is pivotally attached to the front bracket.

The rear bracket has a pin with ends extending therefrom that engage slots in the seat and front brackets. The rear bracket and seat bracket pivot relative to the front bracket, and the pin of the rear bracket slides in slots of the seat and front brackets, as the folding riding vehicle is moved between folded and unfolded configurations. In one embodiment of the invention, the slot of the seat bracket is an elongated slot. In another embodiment of the invention, arcuate slots are formed in the front bracket and the pin of the rear bracket slides through the arcuate slots as the riding vehicle is moved between the folded and unfolded configurations.

The following detailed description of embodiments of the invention, taken in conjunction with the accompanying drawings and claims, provide a more complete understanding of the nature and scope of the invention.

DESCRIPTION OF THE PREFERRED EMBODIMENTS

Figure 1:
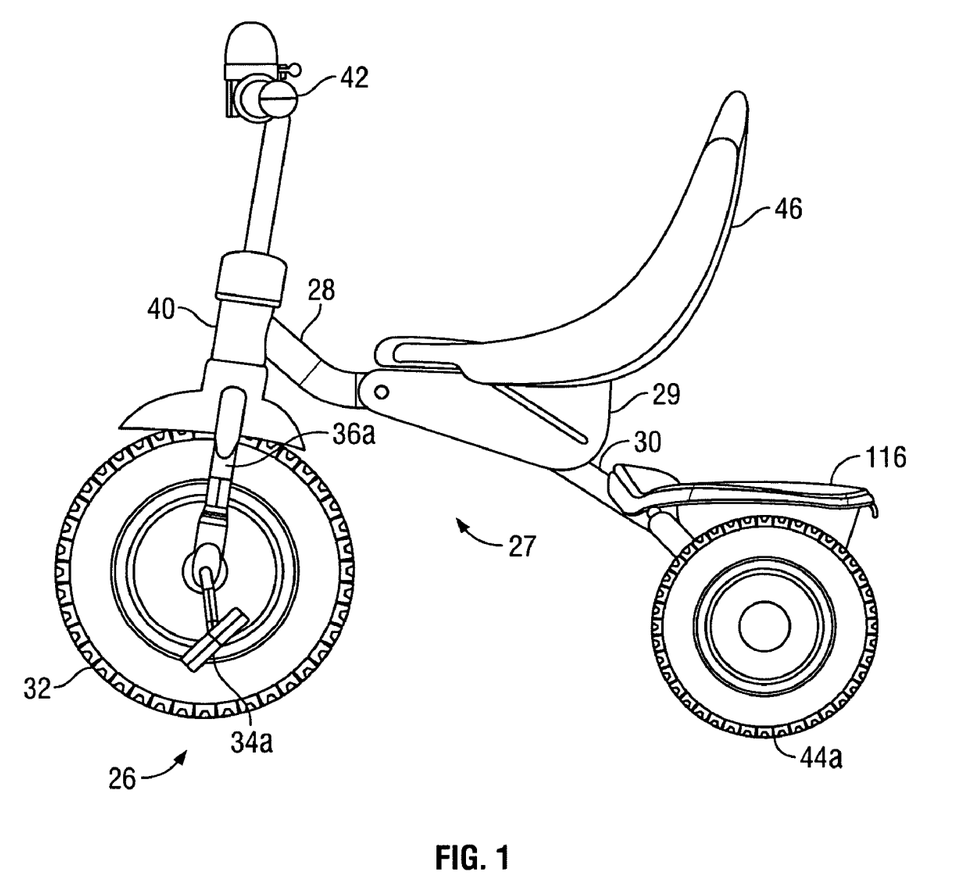
FIG. 1 is a side elevational view of a tricycle embodiment of the folding riding vehicle of the present invention.

An embodiment of the folding riding vehicle of the present invention, in the form of a tricycle, is indicated in general at 26 in FIG. 1. It is to be understood that while the embodiments of the present invention are described below in terms of tricycles, alternative types of riding vehicles, such as bicycles (for both adults and children), foot-to-floor toys or pedal cars, are also contemplated and within the scope of the present invention. The tricycle of FIGS. 1 and 2 features a folding frame, indicated in general at 27 in FIG. 1. The folding frame includes a front frame element 28, a seat bracket 29 and a rear frame element 30.

Figure 2:
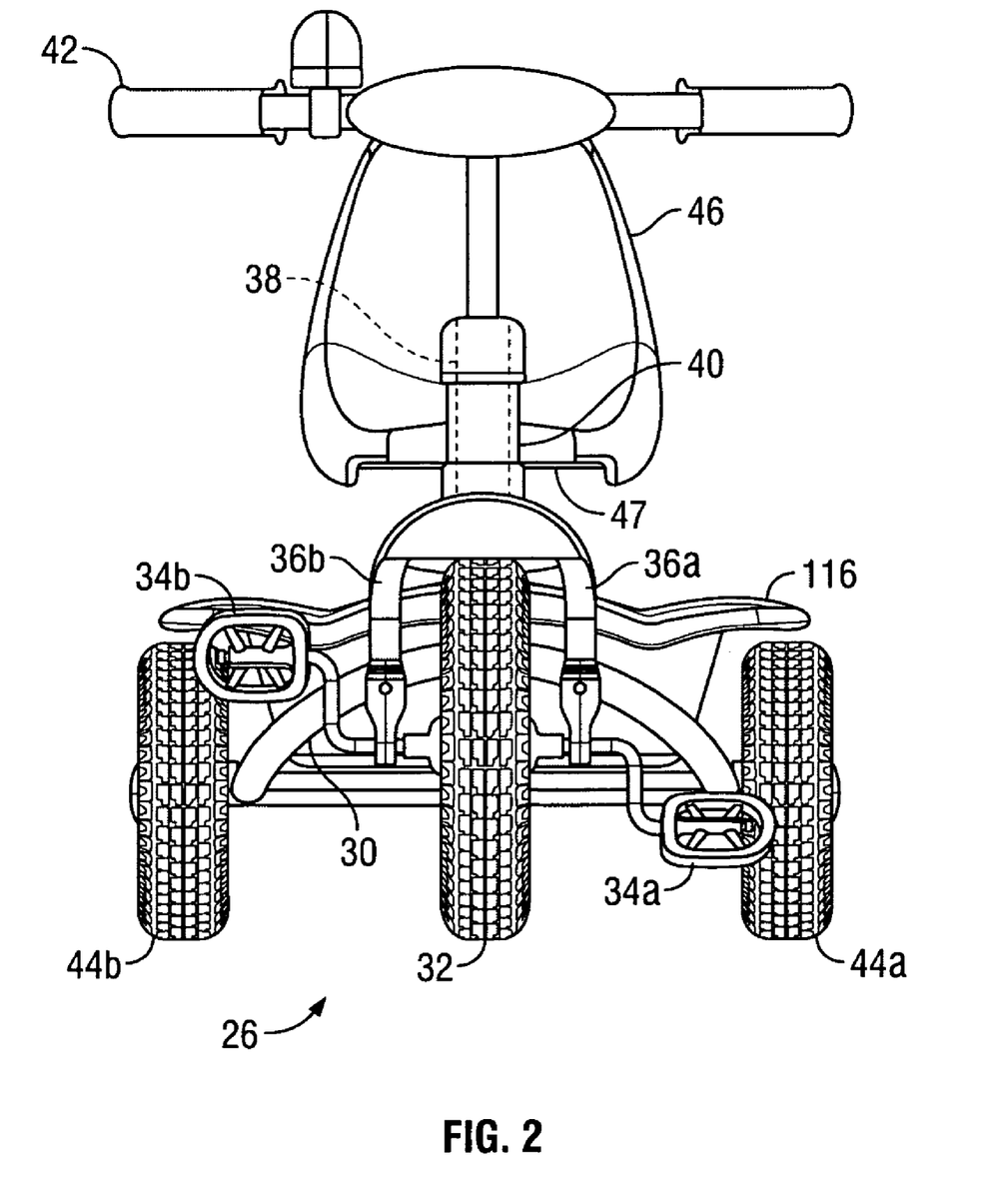
FIG. 2 is a front elevational view of the folding tricycle of FIG. 1.

As illustrated in FIGS. 1 and 2, The tricycle features a front wheel 32 having pedals 34a and 34b attached thereto. The front wheel is mounted between front fork members 36a and 36b, which are attached to the bottom end of a post, indicated in phantom at 38 in FIG. 2. Handlebars 42 are attached to the top end of the post. The post 38 is pivotally mounted to the head tube 40 of front frame element 28 so that the tricycle may be steered. A pair of rear wheels 44a and 44b are attached to the rear frame element 30. A seat 46 is mounted upon the seat bracket 29 via a seat plate 47.

Figure 3:
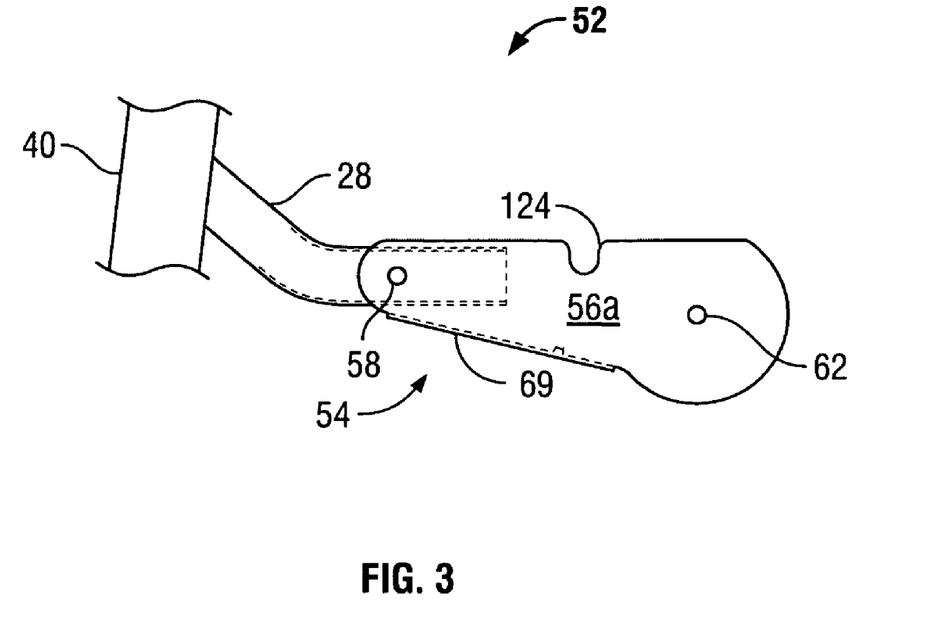
FIG. 3 is an enlarged side elevational view of the front frame element and bracket assembly of the tricycle of FIGS. 1 and 2.
Figure 4:
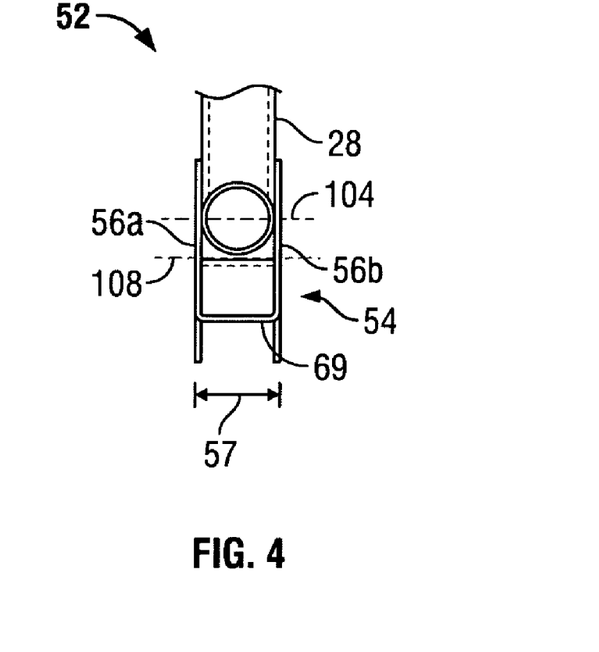
FIG. 4 is a partial rear elevational view of the front frame element and bracket assembly of FIG. 3.

The front frame element and bracket assembly of the tricycle of FIGS. 1 and 2 is indicated in general at 52 in FIGS. 3 and 4. The front frame element and bracket assembly includes the front frame element 28, preferably formed from steel tubing, and a front bracket, indicated in general at 54. The front bracket preferably is formed from a sheet of steel that is bent 90° in two locations so that side plates 56a and 56b are formed. The front frame element 28 is welded between the two side plates 56a and 56b of the front bracket. As illustrated in FIG. 3, aligned seat bracket pivot holes 58 are formed through the side plates 56a and 56b of the front bracket and the front frame element while aligned rear bracket pivot holes 62 are formed through the side plates 56a and 56b. It should be noted that while assembly 52 is illustrated as a welded component, it could instead be formed in a single piece from a variety of materials.

Figure 5:
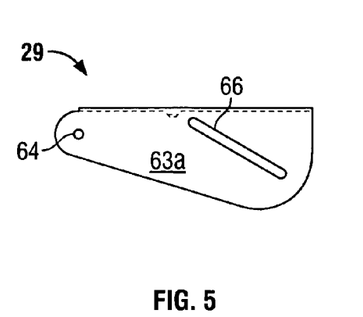
FIG. 5 is an enlarged side elevational view of the seat bracket of the tricycle of FIGS. 1 and 2.
Figure 6:
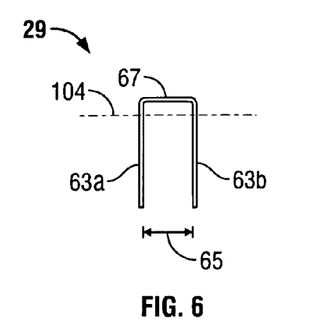
FIG. 6 is rear elevational view of the seat bracket of FIG. 5.

An enlarged view of the seat bracket of FIGS. 1 and 2 is indicated in general at 29 in FIGS. 5 and 6. The seat bracket is preferably formed from a sheet of steel that is bent 90° in two locations so that side plates 63a and 63b are formed. The distance between side plates 63a and 63b, illustrated at 65 in FIG. 6, is slightly greater than the width of front bracket 54, illustrated at 57 in FIG. 4. Aligned front bracket pivot holes 64 are formed through the side plates 63a and 63b as are aligned elongated slots 66.

Figure 13:
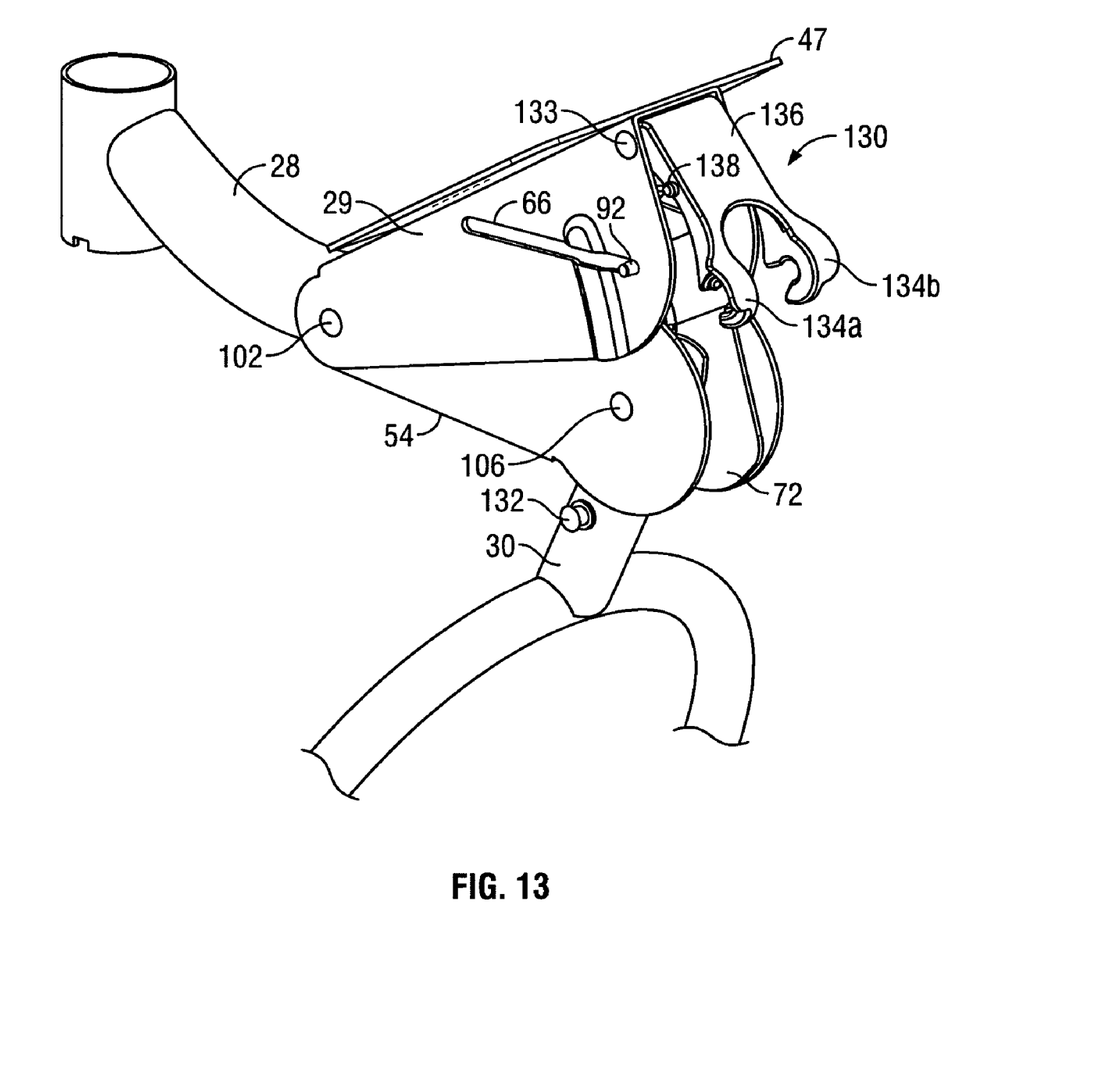
FIG. 13 is a partial perspective view of the folding frame of a second tricycle embodiment of the folding riding vehicle of the present invention in its folded configuration.
Figure 14:
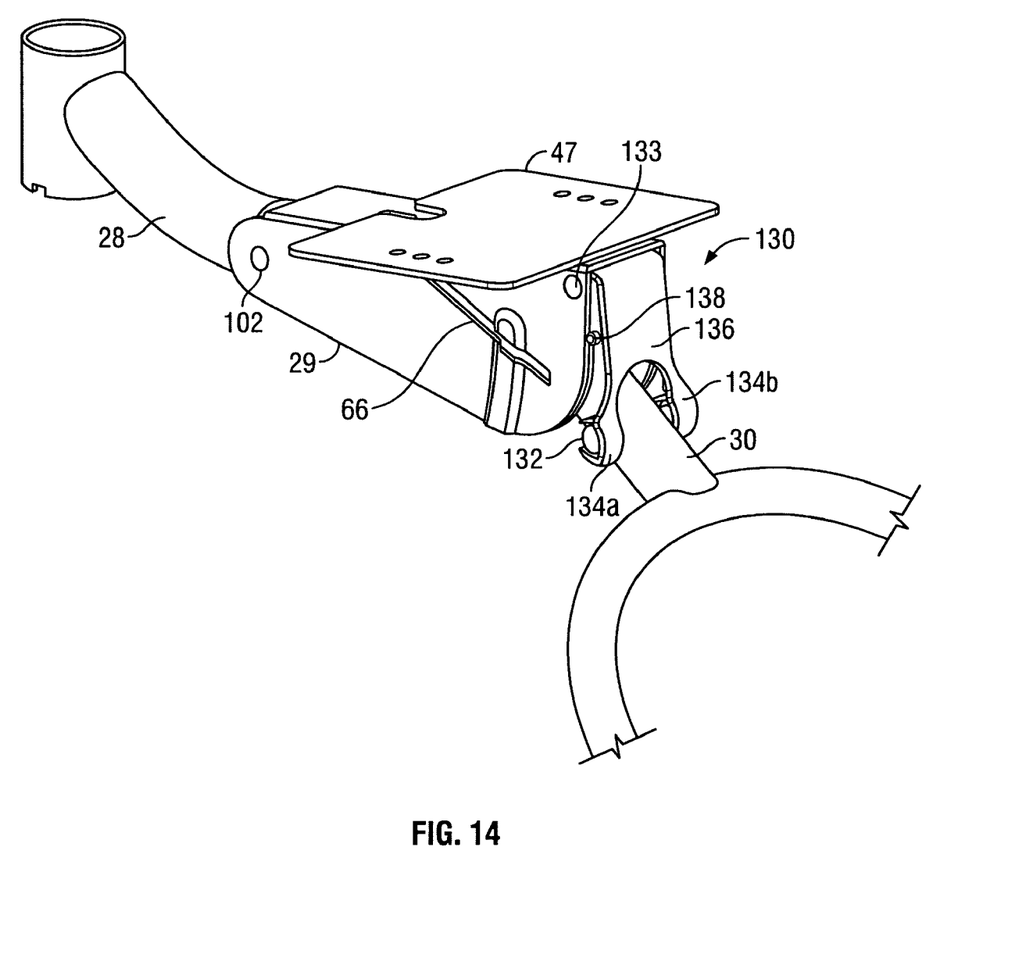
FIG. 14 is a partial perspective view of the folding frame of FIG. 13 in its unfolded configuration.

As illustrated in FIG. 2, the seat 46 of the tricycle is mounted upon a seat panel 47 via bolts or the like. The seat panel 47 preferably is welded to the top plate (67 in FIG. 6) of seat bracket 29 as illustrated in FIGS. 13 and 14.

Figure 7:
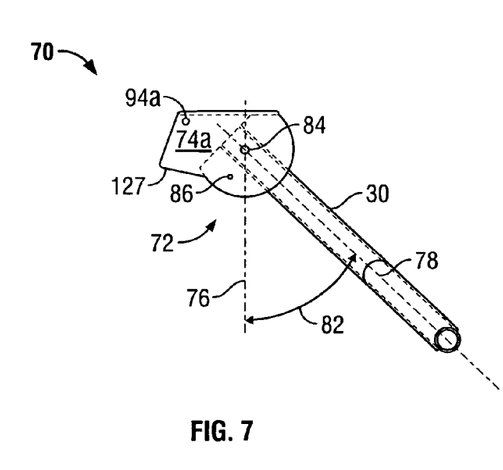
FIG. 7 is an enlarged side elevational view of the rear frame element and bracket assembly of the tricycle of FIGS. 1 and 2.
Figure 8:
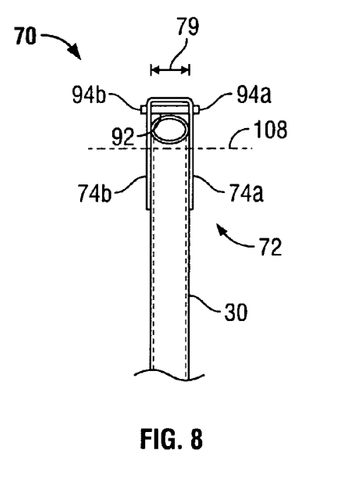
FIG. 8 is partial front elevational view of the rear frame element and bracket assembly of FIG. 7.

The rear frame element and bracket assembly of the tricycle of FIGS. 1 and 2 is indicated in general at 70 in FIGS. 7 and 8. The assembly includes the rear frame element 30 as well as a rear bracket, indicated in general at 72. The rear frame element 30 preferably is formed from steel tubing while the rear bracket 72 preferably is formed from a sheet of steel that is bent 90° in two locations so that side plates 74a and 74b are formed. The rear frame element 30 is welded between the two side plates 74a and 74b of the front bracket. The angle between the vertical axis 76 of the rear bracket 72 and the longitudinal axis 78 of rear frame element 30, indicated at 82, is preferably approximately 47°. The width of rear bracket 72, indicated at 79 in FIG. 8, is less than the width 57 between the side plates 56a and 56b of front bracket 54 of FIG. 4. It should be noted that while assembly 70 is illustrated as a welded component, it could instead be formed in a single piece from a variety of materials.

As illustrated in FIG. 7, aligned front bracket pivot holes 84 are formed through the side plates 74a and 74b of the rear bracket and the rear frame element while aligned safety shield mounting holes 86 are formed through the side plates 74a and 74b. A pin 92 is mounted through aligned holes through side plates 74a and 74b. As a result, the ends 94a and 94b of the pin extend out of side plates 74a and 74b. The ends 94a and 94b of the pin 92 are optionally provided with rollers so that they more easily traverse the elongated slot 66 of the seat bracket. The ends of the pin themselves without rollers, however, may alternatively be used.

Figure 9:
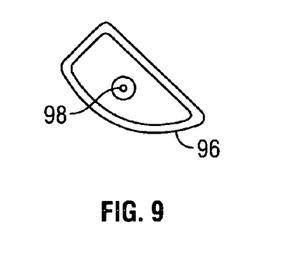
FIG. 9 is a side elevational view of the safety shield of the tricycle of FIGS. 1 and 2.
Figure 10:
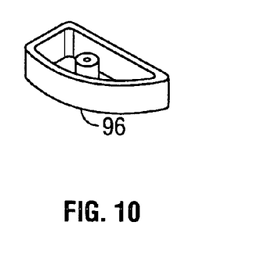
FIG. 10 is a perspective view of the safety shield of FIG. 9

A safety shield, illustrated at 96 in FIGS. 9 and 10, is secured between rear bracket side plates 74a and 74b on one side of rear frame element 30. The shield preferably is secured via a fastener, such as a screw or rivet, that passes through hole 86 in rear bracket 72 and hole 98 of safety shield 96. Safety shield 96 is preferably constructed from plastic. Its function and operation will be explained below.

Front frame element and bracket assembly 52 (FIGS. 3 and 4), seat bracket 29 (FIGS. 5 and 6) and rear frame element and bracket assembly 70 (FIGS. 7 and 8) are the three main components that make up the folding frame 27 of the tricycle of FIGS. 1 and 2. The articulation of these three components as the tricycle of FIGS. 1 and 2 is folded and unfolded will now be explained with the assistance of FIGS. 11 and 12. While the pivot points are described below in terms of rivets, it is to be understood that alternative types of fasteners, such as screws, may be used.

Figure 11:
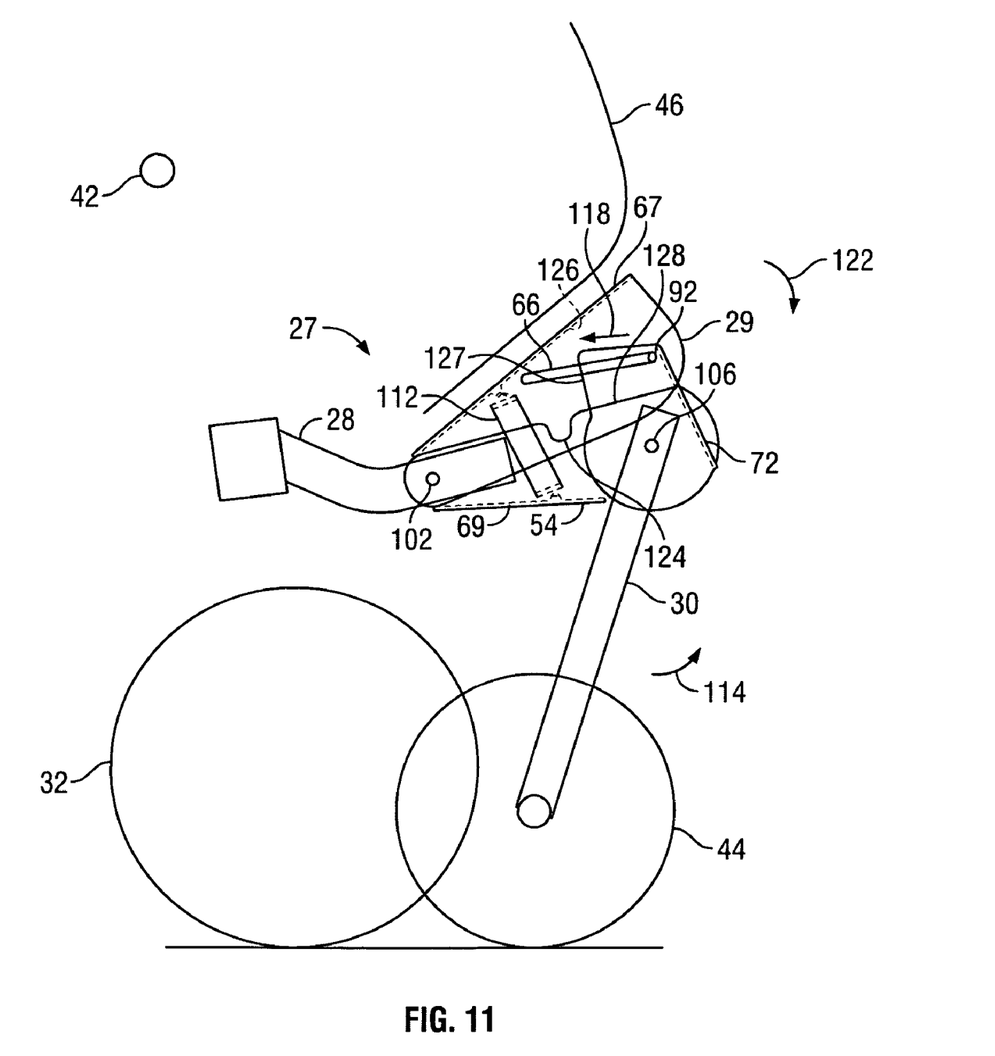
FIG. 11 is a schematic view of the folding frame of the tricycle of FIGS. 1 and 2 in its folded configuration.

The tricycle of FIGS. 1 and 2 is illustrated in FIG. 11 with its frame, indicated in general at 27, in the folded configuration. The seat bracket 29 is positioned over the front bracket 54 so that the front bracket 54 is received between the two seat bracket side plates (63a and 63b in FIG. 6). The seat bracket 29 and front bracket 54 are secured to one another via rivet 102, which passes through holes 58 of FIGS. 3 and 64 of FIG. 5. As a result, the seat bracket and front bracket pivot with respect to one another about axis of rotation 104, illustrated in FIGS. 4 and 6.

The rear bracket 72 is received between the side plates 56a and 56b (FIG. 4) of the front bracket 54. The rear bracket 72 and front bracket 54 are secured to one another via rivet 106, which passes through holes 62 of FIGS. 3 and 84 of FIG. 7. As a result, the rear bracket and front bracket pivot with respect to one another about axis of rotation 108, illustrated in FIGS. 4 and 8.

The ends 94a and 94b (FIG. 8) of the pin 92 of rear bracket 72 are received within the elongated slots 66 of the seat bracket 29. When the frame of the tricycle is in the folded configuration, the pin 92 is at the rear-most end of the slot, as illustrated in FIG. 11. A coil tension spring, 112, is fastened (such as by screws, hooks, etc.) between the top plate of the seat bracket (67 in FIG. 6) and the bottom plate of the front bracket (69 in FIG. 4). The spring is sized so that it gently urges the front and seat brackets towards one another. As a result, the elongated slot 66 excerpts a slight downward pressure on pin 92 so that the tricycle remains in the folded configuration. As rear frame element 30 is moved in the direction of arrow 114 in FIG. 11, the spring's action aids in the unfolding of the tricycle.

As illustrated in FIG. 11, the orientation of the seat bracket 29 and rear frame element 30 relative to the front frame element 28 results in the tricycle seat 46 being moved towards the handlebars 42 and the rear wheels 44 being moved towards the front wheel 32 when the frame 27 is in the folded configuration. As a result, the tricycle features a very compact profile and thus is easy to carry and store when it is in the folded configuration.

Figure 12:
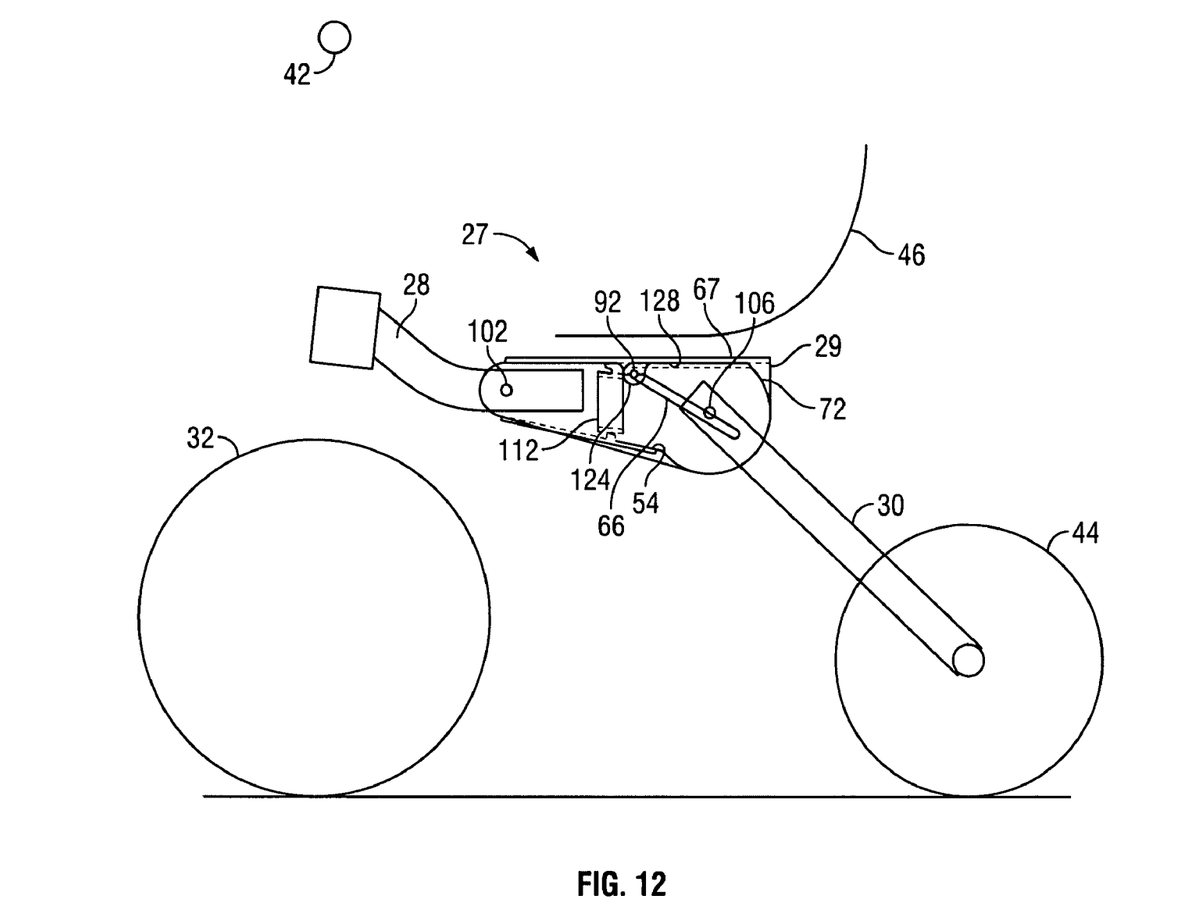
FIG. 12 is a schematic view of the folding frame of the tricycle of FIGS. 1 and 2 in its unfolded configuration.

When a child wishes to ride the tricycle, it may be placed in the unfolded configuration illustrated in FIG. 12. The tricycle is opened into the unfolded configuration by moving rear frame element in the counterclockwise direction with respect to the front frame element 28, as indicated by arrow 114 in FIG. 11. To facilitate this operation, the rear frame element 30 may optionally be provided with a bed or tray of the type illustrated at 116 in FIGS. 1 and 2. The bed or tray 116 of FIGS. 1 and 2, which preferably is made of plastic, provides the tricycle with additional utility and also functions as a handle that may be gripped when folding or unfolding the tricycle.

As the rear frame element 30 is moved counterclockwise with respect to front frame element 28, pin 92 travels towards the front-most end of the elongated slot 66 of the seat bracket 29, as indicated by arrow 118 in FIG. 11. As this occurs, seat bracket 29 pivots in a clockwise direction with respect to front bracket 54 (and front frame element 28), as indicated by arrow 122 in FIG. 11. The safety shield 96 of FIGS. 9 and 10 prevents a child from sticking his or her hands or fingers in the mechanism defined by the front, rear and seat brackets. As a result, the safety shield protects against pinching or similar injuries as the tricycle is folded or unfolded.

As the tricycle becomes completely unfolded, pin 92 arrives at the front-most end of elongated slot 66 and also comes to rest in notch 124 (FIG. 3) of front bracket 54, as illustrated in FIG. 12. In addition, the bottom surface 126 (FIG. 11) of the top plate 67 of seat bracket 29 comes to rest on the top edge 128 of front bracket 54, while the bottom edge 127 (FIGS. 7 and 11) of the rear bracket come to rest upon the bottom plate 69 (FIGS. 3, 4 and 11) of the front bracket, as illustrated in FIG. 12. This results in the tricycle having a very sturdy frame when in the unfolded configuration.

It should be noted that, in an alternative embodiment of the invention, the pin 92 of FIGS. 8, 11 and 12 could be alternatively mounted through the side plates of the seat bracket and a pair of elongated or arcuate slots (corresponding to slots 66) could be formed through the side plates of the rear bracket so that the pin again causes, via travel through the pair of slots in the rear bracket, the seat bracket to pivot clockwise with respect to the front bracket as the rear frame element is moved counterclockwise with respect to the front bracket, and vice versa.

The tension spring 112 of FIGS. 11 and 12 assists in keeping the tricycle in the unfolded configuration. A latching member, indicated in general at 130 in FIGS. 13 and 14, however, may be added to further secure the tricycle in the unfolded configuration. In such an embodiment, a pair of knobs 132 are provided on opposite sides of frame member 30. As an alternative to knobs 132, straight pins or posts may be used. The latching member 130 is attached by its top end to the trailing edge of seat bracket 29 in a pivoting fashion, preferably by rivets 133, and is provided with a pair of claws 134a and 134b at its bottom end. The latching member is preferably molded from plastic or formed from stamped metal.

When the tricycle is placed in the unfolded configuration, the claws 134a and 134b are pushed by an individual via the back 136 of the latching member into engagement with knobs 132, as illustrated in FIG. 14. As will be discussed in greater detail with regard to FIGS. 21 and 22, the latching member may optionally be provided with a spring so as to allow the latching member to automatically latch when the tricycle is unfolded. When it is desired to fold the tricycle, the latching member 130 is pulled back into the position illustrated in FIG. 13 so that the knobs 132 are released from claws 134a and 134b. The latching bracket is provided with a pair of projections 138 that prevent it from getting pushed into the mechanism defined by the front, rear and seat brackets when the tricycle is in the folded configuration.

Figure 15:
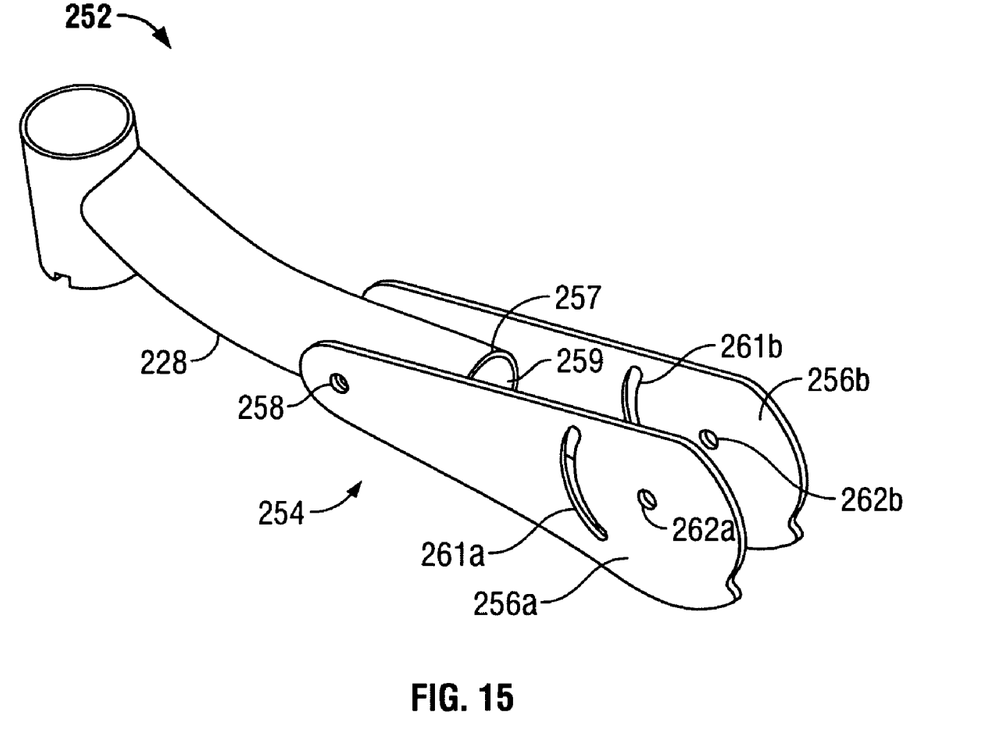
FIG. 15 is perspective view of the front frame element and bracket assembly of a third tricycle embodiment of the folding riding vehicle of the present invention.

The front frame element and bracket assembly of a third tricycle embodiment of the folding riding vehicle of the present invention is indicated in general at 252 in FIG. 15. The front frame element and bracket assembly includes the front frame element 228, preferably formed from steel tubing, and a front bracket, indicated in general at 254. As with the front frame element and bracket assembly of the first embodiment (FIGS. 3 and 4), the front bracket preferably is formed from a sheet of steel that is bent 90° in two locations so that side plates 256a and 256b are formed. The front frame element 228 is welded between the two side plates of the front bracket. It should be noted that while assembly 252 is illustrated as a welded component, it could instead be formed in a single piece from a variety of materials.

The enclosed end 257 of the front frame element 228 features rearward-facing opening 259. Aligned seat bracket pivot holes 258 are formed through the side plates 256a and 256b of the front bracket and the front frame element while aligned rear bracket pivot holes 262a and 262b are formed through the side plates 256a and 256b. A pair of aligned arcuate slots 261a and 261b are formed in the side plates 256a and 256b of the front bracket as well.

Figure 16:
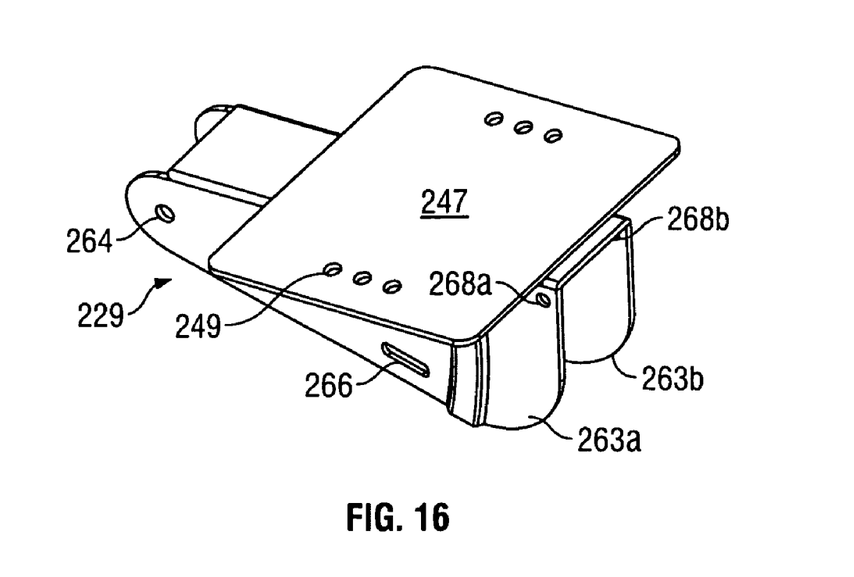
FIG. 16 is a perspective view of the seat bracket of the third tricycle embodiment of the folding riding vehicle of the present invention.

The seat bracket of the third tricycle embodiment is indicated in general at 229 in FIG. 16. As with the seat bracket of the first embodiment (FIGS. 5 and 6), the seat bracket is preferably formed from a sheet of steel that is bent 90° in two locations so that side plates 263a and 263b are formed, and the distance between the side plates is slightly greater than the width of front bracket 254. Aligned front bracket pivot holes 264 are formed through the side plates as are aligned slots 266 and latching member pivot holes 268a and 268b. Seat plate 247 is welded to the top of seat bracket 229. A seat is mounted to the seat plate with bolts or the like via openings 249.

Figure 17:
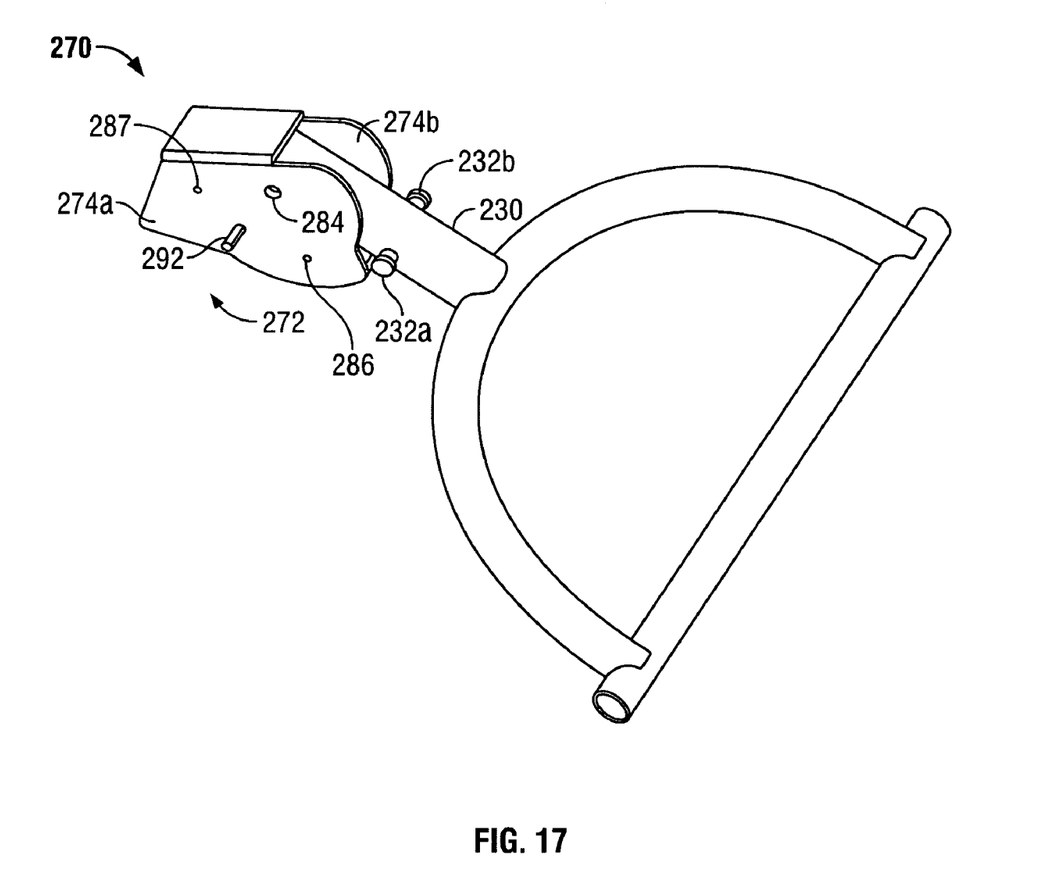
FIG. 17 is a perspective view of the rear frame element and bracket assembly of the third tricycle embodiment of the folding riding vehicle of the present invention.
Figure 18:
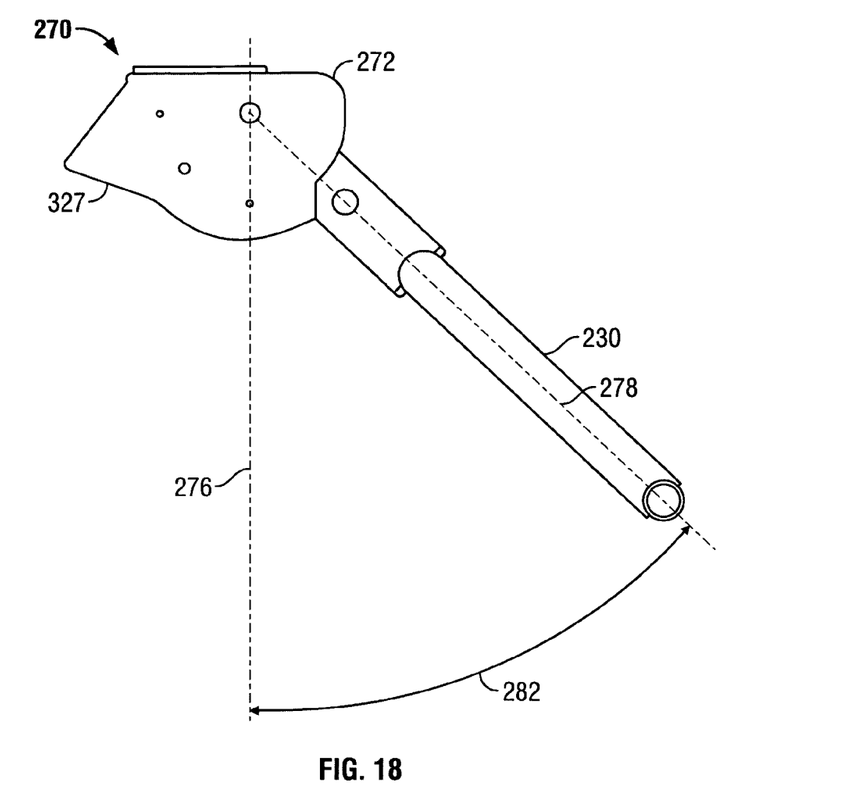
FIG. 18 is a side elevational view of the rear frame element and bracket assembly of FIG. 17.

The rear frame element and bracket assembly of the third tricycle embodiment of the folding riding vehicle of the present invention is indicated in general at 270 in FIG. 17. The assembly includes the rear frame element 230 as well as a rear bracket, indicated in general at 272. As with the rear frame element and bracket assembly of the first embodiment (FIGS. 7 and 8), the rear frame element 230 preferably is formed from steel tubing while the rear bracket 272 preferably is formed from a sheet of steel that is bent 90° in two locations so that side plates 274a and 274b are formed. The rear frame element 230 is welded between the two side plates 274a and 274b of the front bracket and features a pair of knobs (or pins) 232a and 232b. With reference to FIG. 18, the angle between the vertical axis 276 of the rear bracket 272 and the longitudinal axis 278 of rear frame element 230, indicated at 282, is preferably approximately 47°. The width of rear bracket is less than the width between the side plates 256a and 256b of front bracket 254 of FIG. 15. It should be noted that while assembly 270 is illustrated as a welded component, it could instead be formed in a single piece from a variety of materials.

As illustrated in FIG. 17, aligned front bracket pivot holes 284 are formed through the side plates of the rear bracket and the rear frame element while aligned safety shield mounting holes 286 and 287 are formed through the side plates. A pin 292 is mounted through aligned holes through side plates 274a and 274b. As a result, the ends of the pin 292 extend out of side plates. The ends of the pin 292 traverse the slots 266 of the seat bracket of FIG. 16 and the arcuate slots 261a and 261b of the front bracket of FIG. 15.

Figure 19:
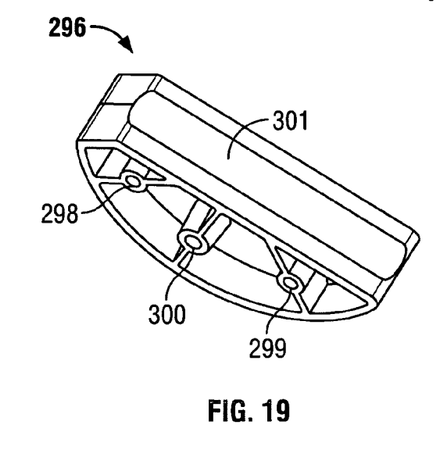
FIG. 19 is a rear perspective view of the safety cam of the third tricycle embodiment of the folding riding vehicle of the present invention.
Figure 20:
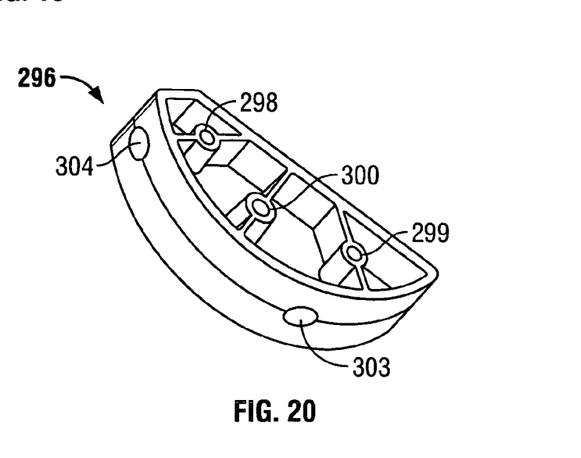
FIG. 20 is a front perspective view of the safety cam of FIG. 19.

A safety cam, indicated in general at 296 in FIGS. 19 and 20, is secured between rear bracket side plates 274a and 274b (FIG. 17) via fasteners, such as screws or rivets, that pass through holes 286 and 287 in rear bracket 272 and holes 298 and 299 of the safety cam. Hole 300 accommodates pin 292 of FIG. 17. As illustrated at 301 in FIG. 19, one side of the safety cam features a channel that is shaped so as to engage rear frame element 230 when fastened between side plates 274a and 274b. As illustrated in FIG. 20, the opposing side of the safety cam is arc-shaped and features two indentations 303 and 304. The safety cam is preferably constructed from plastic and its function and operation will be explained below.

As with the first embodiment, front frame element and bracket assembly 252 (FIG. 15), seat bracket 229 (FIG. 16) and rear frame element and bracket assembly 270 (FIG. 17) are the three main components that make up the folding frame of the third tricycle embodiment of the folding riding vehicle of the present invention. The articulation of these three components as the tricycle is folded and unfolded will now be explained with the assistance of FIGS. 21 and 22. While the pivot points are described below in terms of rivets, it is to be understood that alternative types of fasteners, such as screws, may be used.

Figure 21:
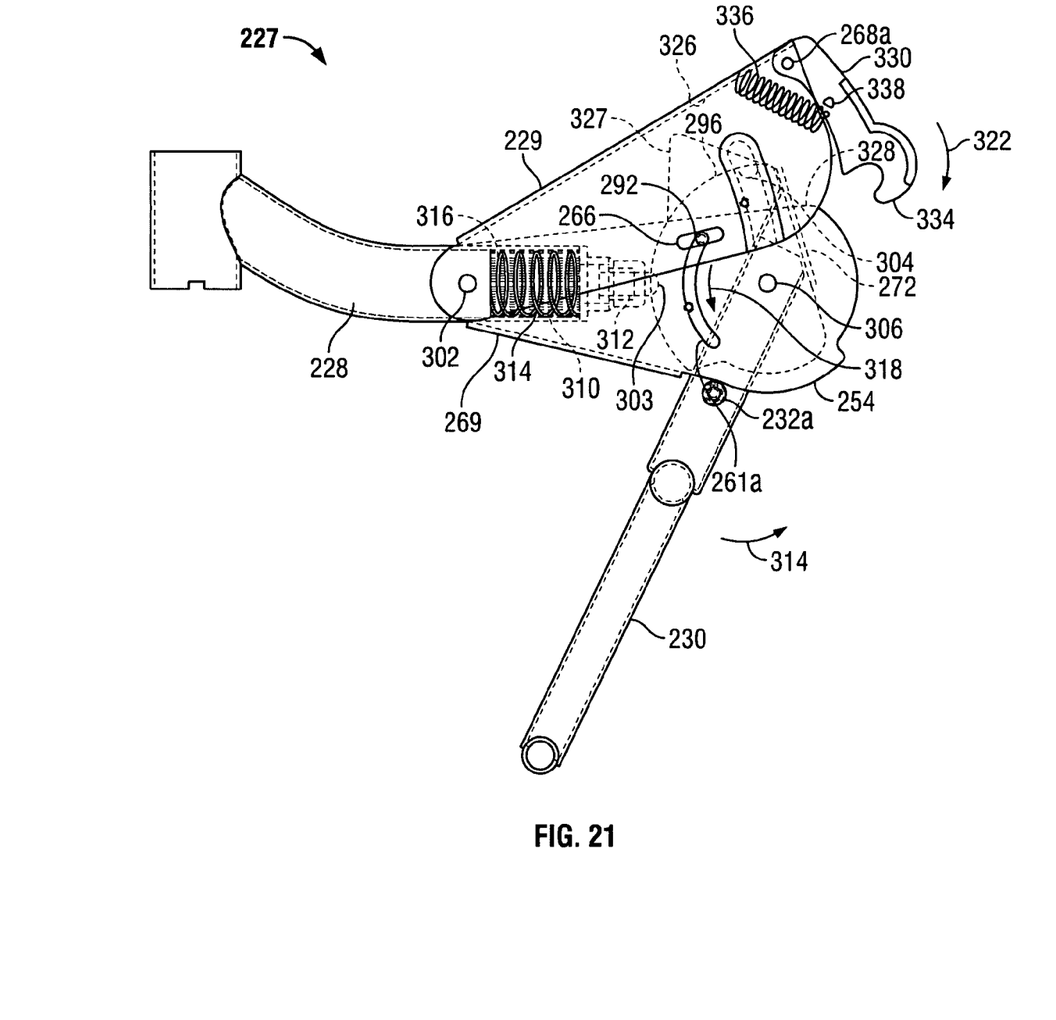
FIG. 21 is a schematic view of the folding frame of the third tricycle embodiment of the folding riding vehicle of the present invention in its folded configuration.

The third tricycle embodiment of the present invention is illustrated in FIG. 21 with its frame, indicated in general at 227, in the folded configuration. The seat bracket 229 is positioned over the front bracket 254 so that the front bracket 254 is received between the two seat bracket side plates (263a and 263b in FIG. 16). The seat bracket 229 and front bracket 254 are secured to one another via a rivet 302, which passes through holes 258 of FIGS. 15 and 264 of FIG. 16. As a result, the seat bracket and front bracket pivot with respect to one another.

The rear bracket 272 is received between the side plates 256a and 256b (FIG. 15) of the front bracket 254. The rear bracket 272 and front bracket 254 are secured to one another via rivet 306, which passes through holes 262a and 262b of FIGS. 15 and 284 of FIG. 17. As a result, the rear bracket and front bracket also pivot with respect to one another.

The pin 292 of rear bracket 272 is received within the slots 266 of the seat bracket 229 as well as the arcuate slots 261a and 261b of the front bracket. When the frame of the tricycle is in the folded configuration, the pin 292 is at the top-most end of the arcuate slots 261a and 261b, as illustrated in FIG. 21.

Figure 22:
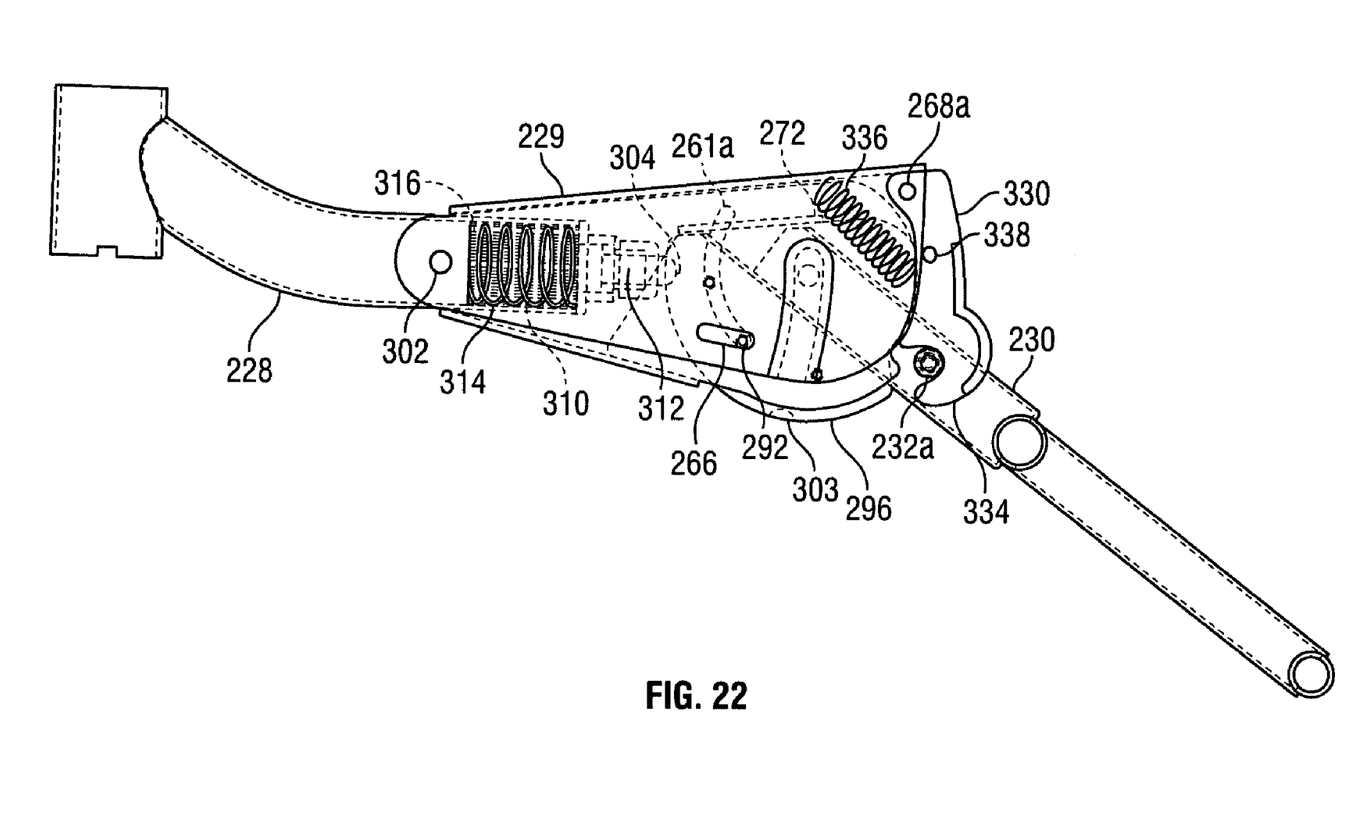
FIG. 22 is a schematic view of the folding frame of FIG. 21 in its unfolded configuration.

A plunger mechanism is inserted into the opening 259 of end 257 of the front frame element 228 of FIG. 15. More specifically, as illustrated in FIGS. 21 and 22, the plunger includes a plunger housing 310 from which a plunger 312 extends. A compression coil spring 314 is positioned within the plunger housing and urges the plunger into the extended position. The plunger housing preferably includes radially extending ribs 316 that permit an interference fit between the plunger housing and the interior of the front frame element 228.

When the tricycle is in the folded configuration, as illustrated in FIG. 21, the plunger 312 engages the indentation 303 of the safety cam 296. This secures the tricycle in the folded configuration until rear frame element 314 is moved counterclockwise, as indicated by arrow 314, so that the pivot 312 travels out of indentation 303.

As with the first embodiment, the orientation of the seat bracket 229 and rear frame element 230 relative to the front frame element 228 results in the seat of the third embodiment being moved towards the handlebars and the rear wheels being moved towards the front wheel when the frame 227 is in the folded configuration. As a result, the tricycle features a very compact profile and thus is easy to carry and store when it is in the folded configuration.

When a child wishes to ride the tricycle, it may be placed in the unfolded configuration illustrated in FIG. 22. The tricycle is opened into the unfolded configuration by moving rear frame element in the counterclockwise direction with respect to the front frame element 228, as indicated by arrow 314 in FIG. 21. As the rear frame element 230 is moved counterclockwise with respect to front frame element 228, pin 292 travels towards the bottom-most end of the arcuate slots 261a and 261b of the front bracket 254, as indicated by arrow 318 in FIG. 21. As this occurs, seat bracket 229 pivots in a clockwise direction with respect to front bracket 254 (and front frame element 228), as indicated by arrow 322 in FIG. 21.

As the tricycle, becomes completely unfolded, pin 292 arrives at the bottom-most end of arcuate slots 261a and 261b of the front bracket and also travels to the rear of slots 266 of the seat bracket. In addition, the bottom surface 326 (FIG. 21) of the top plate of seat bracket 229 comes to rest on the top edge 328 (FIG. 21) of front bracket 254 while the bottom edge 327 (FIGS. 18 and 21) of the rear bracket come to rest upon the bottom plate 269 (FIG. 21) of the front bracket, as illustrated in FIG. 22. This results in the tricycle having a very sturdy frame when in the unfolded configuration.

As illustrated in FIG. 22, plunger 312 comes to rest in the indentation 304 safety cam 296 when the tricycle is in the unfolded configuration. This helps an individual identify when the tricycle has been completely unfolded and also secures the tricycle in the unfolded configuration. The safety cam also prevents a child from inserting his or her hands into the folding mechanism and thus protects against pinching or similar injuries as the tricycle is folded or unfolded.

As with the second embodiment of FIGS. 13 and 14, a latching member 330 may be pivotally attached to the openings 268a and 268b of the seat bracket 229 so that the knobs (or pins) 232a and 232b of rear frame element 230 may be engaged by claws 334 to assist in maintaining the tricycle in the unfolded configuration. A tension coil spring 336 is connected by one end to the bottom surface 326 of the top plate of the seat bracket 229 and by the other end to the latching member 330. The spring ends may be secured by fasteners, openings, tabs or other formations on the seat bracket and latching member, or other fastening arrangements known in the art.

When the tricycle is placed in the unfolded configuration, the claws 334 of the latching member are pulled by the spring 336 into engagement with knobs 232a and 232b, as illustrated in FIG. 22. When it is desired to fold the tricycle, the latching member 330 is pulled back into the position illustrated in FIG. 21 so that the knobs 232a and 232b are released from claws 334. The latching bracket is provided with a pair of projections 338 that prevent it from getting pulled into the mechanism defined by the front, rear and seat brackets when the tricycle is in the folded configuration.

The present invention thus provides a riding vehicle, such as a tricycle, that is easy and safe to fold into a compact configuration that is easy to carry and store. In addition, the present invention provides a folding riding vehicle that is very sturdy and durable. While a tricycle has been described above, it is to be understood that the folding frame of the present invention could alternatively be employed in other types of children's riding vehicles, such as a pedal car, foot-to-floor toy or bicycle, or even riding vehicles for adults, such as a full-sized bicycle.

While the preferred embodiments of the invention have been shown and described, it will be apparent to those skilled in the art that changes and modifications may be made therein without departing from the spirit of the invention, the scope of which is defined by the appended claims.

What is claimed is:

1. A folding riding vehicle comprising:
   a. a front frame element having a front wheel rotatably mounted thereto;
   b. a front bracket attached to the front frame element;
   c. a seat bracket having a seat mounted thereon, said seat bracket pivotally mounted to the front bracket;
   d. a rear frame element having at least one rear wheel rotatably mounted thereto;
   e. a rear bracket attached to the rear frame element in a fixed fashion, said rear bracket pivotally attached to the front bracket independent of the rear frame element, and
   f. a pin joining the seat bracket and the rear bracket so that the seat bracket pivots relative to the front bracket as the rear bracket is pivoted relative to the front bracket as the riding vehicle is moved between folded and unfolded configurations.

2. The folding riding vehicle of claim 1 wherein the pin is mounted to the rear bracket and the seat bracket has a slot therein which receives the pin so that the pin travels through the slot as the riding vehicle is moved between the folded and unfolded configurations.

3. The folding riding vehicle of claim 2 wherein the front bracket has a slot therein which also receives the pin and through which the pin travels as the riding vehicle is moved between the folded and unfolded configurations.

4. The folding riding vehicle of claim 3 wherein the slot of the front bracket is an arcuate slot.

5. The folding riding vehicle of claim 1 wherein the folding riding vehicle is a tricycle.

6. The folding riding vehicle of claim 1 wherein the front bracket has a slot therein which receives the pin and through which the pin travels as the riding vehicle is moved between the folded and unfolded configurations.

7. The folding riding vehicle of claim 1 further comprising a tension spring attached between the seat bracket and the front bracket.

8. The folding riding vehicle of claim 1 further comprising a safety cam mounted to the rear bracket, said safety cam preventing the entry of a hand, fingers or the like between the front bracket and the rear bracket.

9. The folding riding vehicle of claim 8 wherein said safety cam includes a plurality of indentations and further comprising a plunger mechanism mounted to the front bracket, said plunger mechanism including a plunger that engages the indentations of the cam when the riding vehicle is in the folded and unfolded configurations.

10. The folding riding vehicle of claim 1 further comprising a knob attached to the rear frame element and a latching member pivotally attached to the seat bracket, said latching member including a claw that removably engages the knob when the riding vehicle is in the unfolded configuration.

11. The folding riding vehicle of claim 10 further comprising a spring connected between the latching member and the seat bracket and urging the claw into engagement with the knob when the riding vehicle is in the unfolded configuration.

12. The folding riding vehicle of claim 1 wherein said seat bracket features a pair of side plates that straddle said front bracket.

13. The folding riding vehicle of claim 1 wherein said front bracket features a pair of spaced side plates with the front frame element secured there between.

14. The folding riding vehicle of claim 13 wherein said seat bracket features a pair of side plates that straddle the side plates of said front bracket.

15. The folding riding vehicle of claim 14 wherein the rear bracket is pivotally mounted between the side plates of the front bracket.

16. The folding riding vehicle of claim 15 where in the rear bracket features a pair of side plates with the rear frame element secured there between.

17. The folding riding vehicle of claim 13 wherein the rear bracket is pivotally mounted between the side plates of the front bracket.

18. The folding riding vehicle of claim 17 where in the rear bracket features a pair of side plates with the rear frame element secured there between.

19. The folding riding vehicle of claim 1 wherein the rear bracket features a pair of side plates with the rear frame element secured there between.

20. A folding riding vehicle comprising:
   a. a front frame element having a front wheel rotatably mounted thereto;
   b. a front bracket attached to the front frame element;
   c. a seat bracket having a seat mounted thereon, said seat bracket pivotally mounted to the front bracket and having a slot formed therein;
   d. a rear frame element having at least one rear wheel rotatably mounted thereto;
   e. a rear bracket attached to the rear frame element in a fixed fashion, said rear bracket pivotally attached to the front bracket independent of the rear frame element, said rear bracket having a pin extending therefrom and engaging the slot in the seat bracket; and f. said rear bracket and seat bracket pivoting relative to the front bracket, and the pin sliding in the slot, as the folding riding vehicle is moved between folded and unfolded configurations.

21. The folding riding vehicle of claim 20 wherein the front bracket has a slot therein which also receives the pin and through which the pin travels as the riding vehicle is moved between the folded and unfolded configurations.

22. The folding riding vehicle of claim 21 wherein the slot of the front bracket is an arcuate slot.

23. The folding riding vehicle of claim 20 wherein the folding riding vehicle is a tricycle.

24. The folding riding vehicle of claim 20 further comprising a tension spring attached between the seat bracket and the front bracket.

25. The folding riding vehicle of claim 20 further comprising a safety cam mounted to the rear bracket, said safety cam preventing the entry of a hand, fingers or the like between the front bracket and the rear bracket.

26. The folding riding vehicle of claim 25 wherein said safety cam includes a plurality of indentations and further comprising a plunger mechanism mounted to the front bracket, said plunger mechanism including a plunger that engages the indentations of the cam when the riding vehicle is in the folded and unfolded configurations.

27. The riding vehicle of claim 20 further comprising a knob attached to the rear frame element and a latching member pivotally attached to the seat bracket, said latching member including a claw that removably engages the knob when the riding vehicle is in the unfolded configuration.

28. The riding vehicle of claim 27 further comprising a spring connected between the latching member and the seat bracket and urging the claw into engagement with the knob when the folding riding vehicle is in the unfolded configuration.

* * * * *